United States Patent Office 3,122,476
Patented Feb. 25, 1964

3,122,476
TISSUE CULTURE MEDIUM
Lawrence E. Gaeta, Los Angeles, Calif., assignor to Hyland Laboratories
No Drawing. Filed June 21, 1960, Ser. No. 37,584
3 Claims. (Cl. 167—74)

The present invention relates to a novel method of preparing a serum which will support the growth of normal human cells and other animal cells, and to the product thus obtained.

Until quite recently attempts to grow normal human cells and other animal cells in vitro always resulted in either the complete failure of growth or brief periods of growth after which proliferation ceased. In 1958, Dr. Puck and his colleagues described a novel technique in the Journal of Experimental Medicine 108: 945–955 by which they were able to grow cells from tissue samples of different human types. Dr. Puck and his colleagues by applying recently revised single cell techniques were able to grow the human cells and other animal cells in vitro upon a specialized medium containing about 15% of fetal calf serum in combination with vitamins, amino acids, sugars, enzymes, salts and water.

While the discovery that a medium containing as an essential ingredient fetal calf serum will support human cell and other animal cell growth in vitro provides a highly significant break-through in diagnostic medicine it is not without disadvantages. For example, fetal calf serum in addition to being difficult to obtain, often contains, especially in the spring and summer, significant amounts of certain substances which are toxic to normal human cell and other animal cell growth.

It is therefore an object of the present invention to disclose and provide for use in a medium for the growth of normal human cells and other animal cells in vitro a serum which is readily available and relatively non-toxic.

It is furthermore an object to disclose a method of preparing such a serum.

It has now been discovered that the above and still other objects may be obtained by collecting the blood of immature calves, fractionating this blood to obtain the serum, and then treating the serum to remove gamma globulin and other toxic substances present.

In the preferred practice of the present invention, the whole blood of immature calves is collected, separated and filtered to remove the fibrin residue. The filtrate is chilled to about 0° C. and ethyl alcohol added to a concentration of about 20%. Then the serum pH is lowered to about 7, preferably 7 to 7.3 and maintained at that level with an appropriate buffer. Satisfactory buffering solutions include sodium acetate at 1 gm. per liter of serum; potassium phosphate, monobasic at 1 gm. per liter; or glacic acetic acid 3.7 cc. per liter, added as 1 Normal, or HCl 100% added as 1 Normal. The temperature of the buffered serum is adjusted to about −5° C. and the serum agitated for a suitable period of time, normally about 3–4 hours. The precipitate of gamma globulin and unidentified toxic substances which forms, is then removed for the most part by centrifugation. The final traces of the suspended precipitate, if any, may be removed, as for example, by passing the centrifugate through an asbestos filter. The filtrate thus obtained is diluted with 2 volumes of water and lyophilized and used, as is, to prepare a suitable nutrient medium, or is put into solution with $H_2O$ and filter sterilized and used as a sterile solution, or prepared as a lyophilized powder which is stored for later use.

The animals preferred as a source for the serum to be used in the present invention are those immature calves which are 1–4 days old. The blood of these immature calves contains high concentrations of both the desirable alpha globulin and the undesirable gamma globulin and other toxic materials. While the serum of older calves may be used, it is generally found that the ratio of alpha globulin to gamma globulin is such that in most instances it is uneconomical to process the serum.

The practice of the present invention is further illustrated by reference to the following examples:

*Example I*

One liter of immature calf serum was filtered to remove fibrin residue and chilled to 0° C. The pH of the serum was adjusted to 7–7.2 with sodium acetate and 20% ethanol added. The temperature was then lowered to about −5° C. and the mixture mechanically agitated for 3½ hours. The gamma globulin which precipitated was removed by centrifugation followed by filtration through an asbestos filter. The filtrate was diluted with two volumes of water and lyophilized to obtain 45 grams of a dry powder.

To compare the above obtained serum with fetal calf serum, the following complete growth media were prepared:

(A)

| | |
|---|---|
| Hanks balanced salts solution [1] | 170.0 ml. |
| Dextrose, 10% | 5.0 ml. |
| Vitamins solution 100X (Eagle) [2] | 1.8 ml. |
| Amino acids solution 100X (Eagle) [2] | 1.8 ml. |
| L glutamine, 5% solution | 1.0 ml. |
| (Fractionated immature calf serum), newborn Agamma calf serum, 7% solution | 25.0 ml. |
| Penicillin solution | 10,000 units |
| Streptomycin solution | 10,000 mcg. |
| Sodium bicarbonate solution, 1.4% | Quantity sufficient to adjust pH to 7–7.2. |

[1] Hanks, J. H.: Proc. Soc. Exp. Biol. Med. 71: 196, 1949.
[2] Eagle, H., Oyama, J. I., Levy, M., and Freeman, A. E.: J. Biol. Chem. 226: 191, 1957.

(B)

| | Percent |
|---|---|
| N 16: synthetic nutrient solution [1] | 40 |
| Newborn Agamma calf serum, i.e. fractionated immature calf serum, 7% solution | 15 |
| Solution NCTC 109 [2] | 4 |
| Antibiotics solution [1] | 1 |
| Saline F [1], to | 100 |

[1] Puck, T. T., Cieciura, S. J., Robinson, A.: J. Exp. Med. 108: 945–955, 1958.
[2] Evans, V. J., Bryant, J. C., McQuilkin, W. T., Fioramonti, M. C., Sanford K. K., Westfall, B. B. and Earle, W. R.: Cancer Res. 16: 87, 1956.

Media containing the serum of the present invention was found to be less toxic than and as effective as media containing fetal calf serum for the growth of Chinese hamster and human esophageal epithelium cells.

A paper electrophoresis assay of the various calf serums showed the following values:

| Immature Calf Serum (1–4 days old) | | Fetal Calf Serum | | Fractionated Immature Calf Serum of Example I (Immature Agamma Calf Serum) | |
|---|---|---|---|---|---|
| | Percent | | Percent | | Percent |
| Albumin | 28.5 | Albumin | 37.5 | Albumin | 43.8 |
| αGlobulin | 25.0 | αGlobulin | 43.0 | αGlobulin | 35.8 |
| βGlobulin | 12.8 | βGlobulin | 12.5 | βGlobulin | 16.4 |
| γGlobulin | 33.7 | γGlobulin [1] | 7.0 | γGlobulin [1] | 4.0 |

[1] This substance appears to be of the non-toxic non-antibody type gamma globulin or a component which has the mobility of gamma globulin but not the undesirable cell toxicity.

Electrophoresis using Perkin-Elmer apparatus model 38A showed the following values:

| Immature Calf Serum (1-4 days old) | | Fetal Calf Serum | | Fractionated Immature Calf Serum of Example I (Immature Agamma Calf Serum) | |
|---|---|---|---|---|---|
| | Percent | | Percent | | Percent |
| Albumin | 37.6 | Albumin | 43.1 | Albumin | 48.9 |
| αGlobulin | 28.1 | αGlobulin | 48.8 | αGlobulin | 41.3 |
| γGlobulin | 34.3 | βGlobulin | 8.1 | βGlobulin | 9.8 |

Example II

Sixty-five liters of immature calf serum (pH 7.68) were filtered to remove fibrin residue and chilled to 0° C. The pH of the serum was adjusted to 7.31 by adding 17.3 liters of a buffering solution of 95% ethyl alcohol containing 240.5 cc. of glacial acetic acid. The serum temperature was lowered to −3.75, stirred for 3 hours and allowed to stand overnight at −5° C. The gamma globulin which precipitated (3020 gm.) was removed by centrifuging for 2 hours. The centrifugate was then passed through an asbestos filter and the remaining gamma globulin and toxic impurities removed. The filtrate was diluted with 2 volumes of cold distilled water and shelf frozen for lyophilization at a later date.

The serum thus obtained when reconstituted was found to be less toxic and more effective than fetal calf serum as the essential ingredient of a complete growth medium for normal human cells or other animal cells in vitro.

It will be readily apparent to those skilled in the art that many modifications and changes may be made without departing from the spirit and scope of the present invention. For example, in place of ethyl alcohol, other lower alkyl alcohols such as isopropanol and the like may be used. It will likewise be apparent that, the method of the present invention may be used to detoxify otherwise unacceptable fetal calf serum, if desired.

The embodiments of the present invention in which an exclusive property or privilege is claimed are as follows:

1. The method of preparing a newborn calf serum useful in the preparation of a growth medium for normal human and animal cells, which comprises collecting the blood of newborn calves, pooling the serum which contains gamma globulin, removing fibrin from the serum, chilling the serum to about 0° C. and adding concentrated ethanol to the serum to adjust the concentration of the mixture to 20% ethanol, adjusting the pH to about 7 and cooling and agitating the mixture to precipitate all the gamma globulin present then removing said precipitated gamma globulin to obtain a clear serum which is non toxic to normal human and animal cells.

2. A newborn calf serum useful in the preparation of tissue culture media for the growth of normal human and animal cells in vitro, said newborn calf serum containing about 44% albumin, 36% α globulin, and 16% β globulin, and 4% of a nontoxic substance having the cell mobility of gamma globulin as determined by electrophoretic analysis which serum is prepared by the method of claim 1.

3. The method of preparing a newborn calf serum useful in the preparation of a growth medium for normal human and animal cells, which comprises collecting the blood of newborn calves, pooling the serum which contains gamma globulin, removing fibrin from the serum, chilling the serum to about 0° C. and adding concentrated lower alkyl alcohol to the serum to adjust the concentration of the mixture to 20% lower alkyl alcohol, adjusting the pH to about 7 and cooling and agitating the mixture to precipitate all the gamma globulin present, then removing said precipitated gamma globulin to obtain a clear serum which is non toxic to normal human and animal cells.

References Cited in the file of this patent

UNITED STATES PATENTS 2,543,215   Williams _____ Feb. 27, 1951

OTHER REFERENCES

Cohn: JACS, vol. 48, March 1946, pp. 469–475.

Deutsch: J. Biol. Chem., vol. 165, September 1946, pp. 21–35.

Tullis: Blood Cells and Plasma Proteins, Academic Press, N.Y., 1953, pp. 29–32.

Deutsch: J. Biol. Chem. 208: Z, June 1954, pp. 669–678.

Puck: J. Exptl. Med. 108: 6, Dec. 1, 1958, pp. 945–955.